(12) United States Patent
Barac et al.

(10) Patent No.: US 11,470,529 B2
(45) Date of Patent: Oct. 11, 2022

(54) INTELLIGENT GROUPING OF NETWORK NODES FOR REMOTE INTERFERENCE MANAGEMENT

(71) Applicant: TELEFONAKTIEBOLAGET LM ERICSSON (PUBL), Stockholm (SE)

(72) Inventors: Filip Barac, Huddinge (SE); Sebastian Faxér, Stockholm (SE); Naga Vishnu Kanth Irukulapati, Västra Frölunda (SE); Mårten Sundberg, Årsta (SE); Håkan Björkegren, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/278,168

(22) PCT Filed: Sep. 18, 2019

(86) PCT No.: PCT/IB2019/057869
§ 371 (c)(1),
(2) Date: Mar. 19, 2021

(87) PCT Pub. No.: WO2020/058878
PCT Pub. Date: Mar. 26, 2020

(65) Prior Publication Data
US 2021/0352554 A1    Nov. 11, 2021

Related U.S. Application Data

(60) Provisional application No. 62/734,867, filed on Sep. 21, 2018.

(51) Int. Cl.
*H04W 4/00* (2018.01)
*H04W 36/20* (2009.01)
(Continued)

(52) U.S. Cl.
CPC ............ *H04W 36/20* (2013.01); *H04B 17/27* (2015.01); *H04B 17/345* (2015.01); *H04W 36/06* (2013.01)

(58) Field of Classification Search
USPC .................................. 370/328, 329, 330, 331
See application file for complete search history.

(56) References Cited

U.S. PATENT DOCUMENTS

2021/0321417 A1\* 10/2021 Kim ..................... H04W 72/082

FOREIGN PATENT DOCUMENTS

| CN | 101686550 A | \* | 3/2010 |
| CN | 102595471 A | | 7/2012 |
| WO | 2013137796 A1 | | 9/2013 |

OTHER PUBLICATIONS

3rd Generation Partnership Project; Technical Specification Group Services and System Aspects; System Architecture for the 5G System; Stage 2 (Release 16) 3GPP TS 23.501 V16.1.0 (Jun. 2019).
(Continued)

*Primary Examiner* — David Q Nguyen

(57) ABSTRACT

Embodiments of the disclosed techniques include methods for remote interference management (RIM) implemented in a network device in charge of management in a wireless network. In one embodiment, a method includes receiving messages from a set of base stations, wherein each message from a base station of the set of base stations indicates that the base station is interfered. The method further includes grouping the set of base stations into a set of reference signal groups based on the messages, each reference signal group being mapped to a reference signal group identifier; and the method continues with sending a respectively mapped reference signal group identifier to each of the set of base stations. Embodiments of the invention also include methods to group base stations causing the interference.

17 Claims, 16 Drawing Sheets

(51) Int. Cl.
*H04B 17/27* (2015.01)
*H04B 17/345* (2015.01)
*H04W 36/06* (2009.01)

(56) References Cited

OTHER PUBLICATIONS

3rd Generation Partnership Project; Technical Specification Group Radio Access Network; NG-RAN; NG Application Protocol (NGAP) (Release 15) 3GPP TS 38.413 V15.3.0 (Mar. 2019).

* cited by examiner

INTELLIGENT GROUPING OF NETWORK NODES FOR REMOTE INTERFERENCE MANAGEMENT

CROSS-REFERENCE TO RELATED APPLICATIONS

This application is a 371 of International Application No. PCT/IB2019/057869, filed on Sep. 18, 2019, which claims priority to U.S. Patent Application No. 62/734,867, filed on Sep. 21, 2018, the contents of which are hereby incorporated by reference in their entirety.

TECHNICAL FIELD

Embodiments of the invention relate to the field of networking; and more specifically, to remote interference management in a wireless network.

BACKGROUND ART

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Wireless cellular networks are built up of cells, each cell defined by a certain coverage area of a radio base station (BS). The BSs communicate with terminals/user equipment (UE) in the networks wirelessly. The communication is carried out in either paired or unpaired spectrum. In the case of paired spectrum, the downlink (DL) and uplink (UL) directions are separated in frequency, called Frequency Division Duplex (FDD). In the case of unpaired spectrum, the DL and UL use the same spectrum, called Time Division Duplex (TDD). As the name implies, the DL and UL are separated in the time domain, typically with guard periods (GP) between them. A guard period serves several purposes. Most essentially, the processing circuitry at the BS and UE needs sufficient time to switch between transmission and reception; however, this is typically a fast procedure and does not significantly contribute to the requirement of the guard period size. There is one guard period at a downlink-to-uplink switch and one guard period at an uplink-to-downlink switch. Since the guard period at the uplink-to-downlink switch only needs to give enough time to allow BS and UE to switch between reception and transmission, and consequently typically is small, it is for simplicity neglected in the following description. The guard period at the downlink-to-uplink switch, however, must be sufficiently large to allow a UE to receive a (time-delayed) DL grant scheduling the UL and transmit the UL signal with proper timing advance (compensating for the propagation delay) such that it is received in the UL part of the frame at the BS (in fact, the guard period at the uplink-to-downlink switch is created with an offset to the timing advance). Thus, the guard period at the downlink-to-uplink switch should be larger than two times the propagation time towards a UE at the cell edge, otherwise, the UL and DL signals in the cell will interfere. Because of this, the guard period at the downlink-to-uplink switch is typically chosen depending on the cell size such that larger cells (i.e., larger inter-site distances) have a larger GP and vice versa.

Additionally, the guard period may be chosen to reduce DL-to-UL interference between BSs by allowing a certain propagation delay between cells without having the DL transmission of a first BS enter the UL reception of a second BS. In a typical macro network, the DL transmission power can be on the order of 20 dB larger than the UL transmission power, and the pathloss between base stations, perhaps above roof top and in line-of-sight (LOS), may often be much smaller than the pathloss between base stations and terminals (in non-line-of-sight (NLOS)). Hence, if the UL is interfered by the DL of other cells (so called cross-link interference) the UL performance can be seriously degraded. Because of the large transmit power discrepancy between UL and DL and/or propagation conditions, cross-link interference can be detrimental to system performance not only for the co-channel case (where DL interferes UL on the same carrier) but also for the adjacent channel case (where DL of one carrier interferes with UL on an adjacent carrier). Because of this, TDD macro networks are typically operated in a synchronized and aligned fashion where the symbol timing is aligned and a semi-static TDD UL/DL pattern, which is the same for all the cells in the network, is used. By aligning uplink and downlink periods, they do not occur simultaneously, thus reducing interference between uplink and downlink. Typically, operators with adjacent TDD carriers also synchronize their TDD UL/DL patterns to avoid adjacent channel cross-link interference.

The principle of applying a guard period (GP), at the downlink-to-uplink switch, to avoid DL-to-UL interference between BSs is shown in FIG. 1 where a victim BS (V) 102 is being (at least potentially) interfered by an aggressor BS (A) 104. The aggressor sends a DL signal to a device 106 in its cell, and the DL signal also reaches the victim BS 102 (e.g., when the propagation loss is not enough to protect it from the signals of A), which is trying to receive a signal from another terminal (not shown in the figure) in its cell. The signal has propagated a distance (d) and due to propagation delay, the experienced frame structure alignment of A at V is shifted/delayed T seconds at reference 112, proportional to the propagation distance d. As can be seen from the figure, although the DL part of the aggressor BS (A) is delayed, it does not enter the UL region of the victim (V) due to the guard period used. The system design of the guard period thus serves its purpose. As a side note, the aggressor DL signal does of course undergo attenuation, but may still be very high relative to the received victim UL signal due to differences in transmit powers in terminals and base stations as well as propagation condition differences for base station-to-base station links and terminal-to-base station links. Note that the terminology victim and aggressor is only used here to illustrate why typical TDD systems are designed as they are. The victim can also act as an aggressor and vice versa and even simultaneously since channel reciprocity exists between the BSs.

Remote interference management (RIM) may be used to mitigate DL-to-UL interference (e.g., occurred due to ducting events in TDD macro deployments. For instance, an aggressor BS may increase its GP (and thereby reduce the number of DL symbols in its cell). While this reduces DL capacity in the aggressor cell, it may reduce the UL interference level in the victim cell and therefore be beneficial to the overall network performance. As such a measure reduces resources in one cell to protect resources in another cell, it is crucial to apply the mechanism only when the remote BS aggressor is causing interference to the victim, e.g., when a tropospheric ducting event occurs. Thus, the (potential) aggressor BS needs to be made aware that it is causing interference to a (potential) victim BS in order to know when to apply the remote interference mitigation mechanism.

In some remote interference mitigation schemes, the victim of remote interference transmits a reference signal (RS) in certain time locations in order to make aggressor(s) aware that they are causing interference to the victim. Since the propagation channel is reciprocal in TDD systems, the aggressor would receive the RS at the same signal strength as the victim receives the aggressor's interfering signal (given that the same TX power and TX/RX antenna patterns are used for both transmissions). A potential aggressor BS would then monitor certain time locations for RSs transmitted by potential victims, and upon detection of an RS sequence it would infer that it is causing remote interference to a certain victim BS (whereon it may apply a remote interference mitigation mechanism).

Such an RS is typically transmitted by the victim at the end of the DL region (right before the GP) and the potential aggressor monitors the start of the UL region (right after the GP) for transmitted RSs.

SUMMARY OF THE INVENTION

Embodiments of the disclosed techniques include methods for remote interference management (RIM) implemented in a network device in charge of management in a wireless network. In one embodiment, a method includes receiving messages from a set of base stations, wherein each message from a base station of the set of base stations indicates that the base station is interfered. The method further includes grouping the set of base stations into a set of reference signal groups based on the messages, each reference signal group being mapped to a reference signal group identifier; and the method continues with sending a respectively mapped reference signal group identifier to each of the set of base stations.

Embodiments of the disclosed techniques include network devices for remote interference management (RIM) in a wireless network. In one embodiment, a network device comprises a processor and non-transitory computer-readable storage medium that provides instructions that, when executed by the processor, cause the network device to perform one or more methods for remote interference management (RIM). One method includes receiving messages from a set of base stations, wherein each message from a base station of the set of base stations indicates that the base station is interfered. The method further includes grouping the set of base stations into a set of reference signal groups based on the messages, each reference signal group being mapped to a reference signal group identifier; and the method continues with sending a respectively mapped reference signal group identifier to each of the set of base stations.

Embodiments of the disclosed techniques include non-transitory computer-readable storage media for remote interference management (RIM) in a wireless network. In one embodiment, a non-transitory computer-readable storage medium provides instructions that, when executed, cause a network device to perform one or more methods for remote interference management (RIM). One method includes receiving messages from a set of base stations, wherein each message from a base station of the set of base stations indicates that the base station is interfered. The method further includes grouping the set of base stations into a set of reference signal groups based on the messages, each reference signal group being mapped to a reference signal group identifier; and the method continues with sending a respectively mapped reference signal group identifier to each of the set of base stations.

Embodiments of the disclosed techniques provide ways for network devices to perform remote interference management so that the reaction time of a wireless network to remote interference may be reduced.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
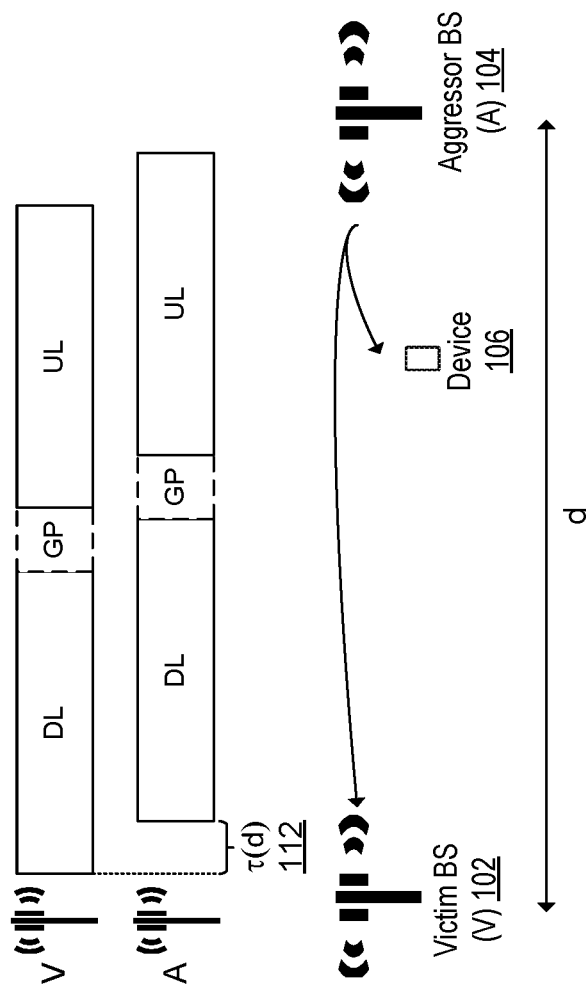
FIG. 1 illustrates downlink-to-uplink interference avoidance in a wireless network using a guard period.

Some of the embodiments contemplated herein will now be described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

References in the specification to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein, refers to any positive whole number of items including one item.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical, or other form of propagated signals—such as carrier waves, infrared signals). Thus, an electronic device (e.g., a computer) includes hardware and software, such as a set of one or more processors (e.g., of which a processor is a microprocessor, controller, microcontroller, central processing unit, digital signal processor, application specific integrated circuit (ASIC), field programmable gate array (FPGA), other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed). When the electronic device is turned on, that part of the code that is to be executed by the processor(s) of the electronic device is typically copied from the slower non-volatile memory into volatile memory (e.g., dynamic random-access memory (DRAM), static random-access memory (SRAM)) of the electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of (1) receiving data from other electronic devices over a wireless connection and/or (2) sending data out to other devices through a wireless connection. This radio circuitry may include transmitter(s), receiver(s), and/or transceiver(s) suitable for radiofrequency communication. The radio circuitry may convert digital data into a radio signal having the proper parameters (e.g., frequency, timing, channel, bandwidth, and so forth). The radio signal may then be transmitted through antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate with wire through plugging in a cable to a physical port connected to a NIC. One or more parts of an embodiment of the disclosure may be implemented using different combinations of software, firmware, and/or hardware.

A network device (ND) (also referred to as a network node or node, these terms are used interchangeably in this disclosure unless noted otherwise) is an electronic device in a wireless communication network via which a terminal device accesses the network and receives services therefrom. One type of network device may refer to a base station (BS) or an access point (AP), for example, a node B (NodeB or NB), an evolved NodeB (eNodeB or eNB), a next generation node B (gNB), remote radio unit (RRU), a radio header (RH), a remote radio head (RRH), an Integrated Access and Backhaul (IAB) node or IAB donor, a relay, and a low power node such as a femtocell and a picocell. As known in the art, a gNB (or eNB) may comprise two network devices, a central unit (CU) and a distributed unit (DU); and a message/signal/packet sent to the CU or DU of a gNB/eNB may be referred to as the message/signal/packet to the gNB/eNB. The CU is a logical node that includes the gNB/eNB functions like Transfer of user data, Mobility control, Radio access network sharing, Positioning, Session Management, etc., except those functions allocated exclusively to the DU. The DU is another logical node that includes a subset of the gNB/eNB functions, depending on the functional split option. Its operation is controlled by the CU. Distributed Unit (DU) is also known with other names like RRH, RRU, remote element (RE), and remote unit (RU).

A terminal device may access a wireless communication network and receive services from the wireless communication network through a network device. A terminal device may also be referred to as a wireless device (WD), and the two terms are used interchangeably in this disclosure. A terminal device may be a user equipment (UE), which may be a subscriber station (SS), a portable subscriber Station, a mobile station (MS), or an access terminal (AT). The terminal device may be one of a mobile phone, a cellular phone, a smart phone, a tablet, a wearable device, a personal digital assistant (PDA), a portable computer, an image capture terminal device such as a digital camera, a gaming terminal device, a music storage and playback appliance, a vehicle-mounted wireless terminal device, a smart speaker, a set-top box. While UEs (particularly the next generation UEs, gUEs) are used as the terminal devices in the examples of remote interference management (RIM), embodiments of the invention apply to other terminal devices as well.

A wireless communication network is a network of electronic devices communicating using radio waves (electromagnetic waves within the frequencies 30 KHz-300 GHz). A wireless communication may follow wireless communication standards, such as new radio (NR), LTE (Long-Term Evolution), LTE-Advanced (LTE-A), wideband code division multiple access (WCDMA), High-Speed Packet Access (HSPA). Furthermore, the communications between the electronic devices such as network devices and terminal devices in the wireless communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. While LTE and NR are used as examples to describe embodiments of the disclosure, the disclosure may apply to other wireless communication networks, including LTE operating in unlicensed spectrums, Multefire system, IEEE 802.11 systems.

The term base station is a more general term and can correspond to any type of radio network node or any network node, which communicates with a UE and/or with another network node. Examples of network nodes include NodeB, base station (BS), multi-standard radio (MSR) radio node such as MSR BS, eNB, eNB-CU, eNB-DU, gNB, gNB-CU, gNB-DU, gNB-CU-UP (user plane), gNB-Du-UP (control plane), MeNB, SeNB, network controller, radio network controller (RNC), core network node (Access and Mobility Management function (AMF), Mobility Management Entity (MME), Mobile Switching Center (MSC), etc.), base station controller (BSC), road side unit (RSU), an Integrated Access and Backhaul (IAB) node or IAB donor, relay, donor node controlling relay, base transceiver station (BTS), access point (AP), transmission points, transmission nodes, RRU, RRH, nodes in distributed antenna system (DAS), Operations and Management (O&M), Operations Support Systems (OSS), Self-Organizing Network (SON), positioning node (e.g., Enhanced—Serving Mobile Location Center (E-SMLC)), etc. While base stations are used as the network nodes in the examples of remote interference management (RIM), embodiments of the invention apply to other network nodes or network devices as well.

The term radio access technology, or RAT, may refer to any RAT (e.g., Universal Terrestrial Radio Access (UTRA), Evolved UTRA (E-UTRA), narrow band internet of things (NB-IoT), WiFi, Bluetooth, next generation RAT (NR), 4G, 5G), etc. Any of the first and the second nodes may be capable of supporting a single or multiple RATs.

The term reference signal used herein can be any physical signal or physical channel Examples of downlink reference signals are Primary Synchronization Signal (PSS), Secondary Synchronization Signal (SSS), Cell-specific Reference Signal (CRS), Positioning Reference Signal (PRS), Channel state information reference signal (CSI-RS), Demodulation Reference Signal (DMRS), Narrowband Reference Signal (NRS), Narrowband Primary Synchronization Signal (NPSS), Narrowband Secondary Synchronization Signal (NSSS), Synchronization Signal (SS), Multimedia Broadcast multicast service Signal Frequency Network Reference Signal (MBSFN RS), etc. Examples of uplink reference signals are Sounding Reference Signal (SRS), DMRS, etc.

Remote interference is referred to as an interfering source to a BS receiver that is not expected to always be present and that occurs in certain parts of the frame structure and exhibits certain identifiable characteristics. A base station (BS) that can detect such remote interference is referred to as a victim base station (BS). A BS that is causing such a remote interference is called an aggressor base station (BS). A given BS can act as both aggressor and victim.

5G System Architecture

Figure 2:
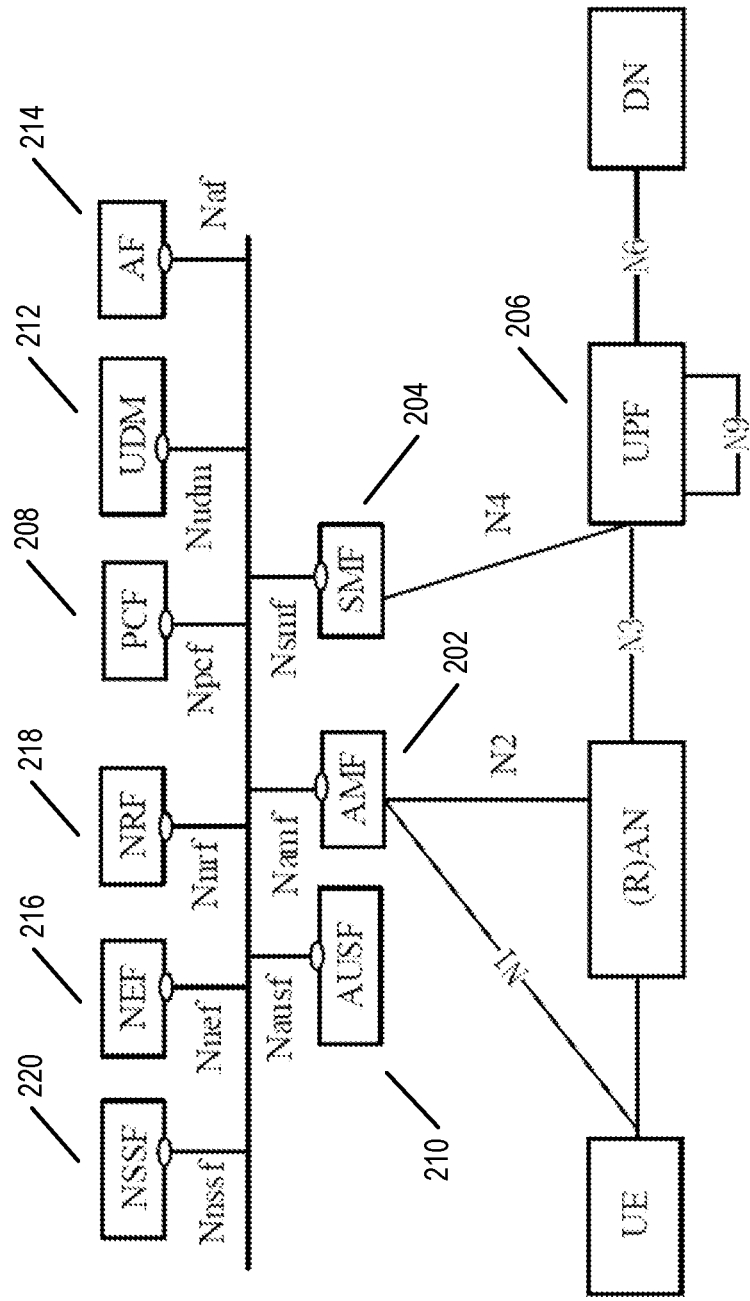
FIG. 2 illustrates an exemplary 5G system architecture.

FIG. 2 illustrates an exemplary 5G system architecture. The 5G system architecture includes the following network functions (NF):

Access and Mobility Management Function (AMF) 202 supports: Termination of Non-access stratum (NAS) signalling, NAS ciphering & integrity protection, registration management, connection management, mobility management, access authentication and authorization, security context management.

Session Management Function (SMF) 204 supports: session management (session establishment, modification, release), UE IP address allocation & management, dynamic host configuration protocol (DHCP) functions, termination of NAS signalling related to session management, DL data notification, traffic steering configuration for UPF for proper traffic routing.

User Plane Function (UPF) 206 supports: packet routing & forwarding, packet inspection, QoS handling, acts as external protocol data unit (PDU) session point of interconnect to Data Network (DN) and is an anchor point for intra- & inter-radio access technology (RAT) mobility.

Policy Control Function (PCF) 208 supports: unified policy framework, providing policy rules to control plane functions, access subscription information for policy decisions in unified data repository (UDR).

Authentication Server Function (AUSF) 210 acts as an authentication server.

Unified Data Management (UDM) 212 supports: generation of Authentication and Key Agreement (AKA) credentials, user identification handling, access authorization, subscription management.

Application Function (AF) 214 supports: application influence on traffic routing, accessing NEF, interaction with policy framework for policy control.

Network Exposure Function (NEF) 216 supports: exposure of capabilities and events, secure provision of information from external application to the third Generation Partnership Project (3GPP) network, translation of internal/external information.

NF Repository Function (NRF) 218 supports: service discovery function, maintains NF profile and available NF instances.

Network Slice Selection Function (NSSF) 220 supports: selecting of the Network Slice instances to serve the UE, determining the allowed Network Slice Selection Assistance Information (NSSAI), determining the AMF set to be used to serve the UE.

A wireless system such as a 5G system may be managed by an Operations, Administration and Maintenance (OAM) system, which is responsible for configuring, managing, and orchestrating nodes and functionalities in the network, including management of Self-Optimizing Networks (SON) automation processes. Generally, different nodes may be managed by different OAM systems, which, in turn, may communicate with each other. An OAM system may provide an interface for manual configuration, or, OAM functionalities may be controlled and optimized by machine intelligence.

From management point of view, a wireless system can be abstracted into different layers as known in the art. The lowest layer consists of Network Elements (NEs), which are discrete telecommunications entities that can be managed over specific interfaces. In the context of RIM, the NEs may be individual base stations (e.g., gNBs) in the network (or alternatively, individual DUs or CUs of a gNB if split architecture is used), which may, in general, be provided by different gNB vendors. Intra-vendor inter-gNB communication is done over proprietary protocols, while inter-vendor inter-gNB communication is provided over the Xn protocol. The NEs (e.g., gNBs) are managed by Element Managers (EM) in the EM layer, a layer above the NE layer and typically from the same vendor as the NE. The EMs may also be encapsulated in a Domain Manager (DM) but may also be logically contained inside the NE itself. EMs (or their respective DMs) from different vendors may communicate over the Itf-Point-to-Point (P2P) protocol specified in 3GPP Service and System Aspects Technical Specifications Group, SA5. These EMs are in turn controlled by the Operations Support System (OSS) layer, which comprises the OAM system(s). The OAM provides proprietary vendor-specific interfaces to manage the nodes from each specific vendor. Additionally, the itf-N interface is specified in SA5 for the exchange of non-vendor-specific messages between the OAM and the EMs.

NR Frame Structure

The RAT next generation mobile wireless communication system (5G) or new radio (NR), supports a diverse set of use cases and a diverse set of deployment scenarios. The latter includes deployment at both low frequencies (100s of MHz), similar to the RAT LTE today, and very high frequencies (mm waves in the tens of GHz).

Figure 3:
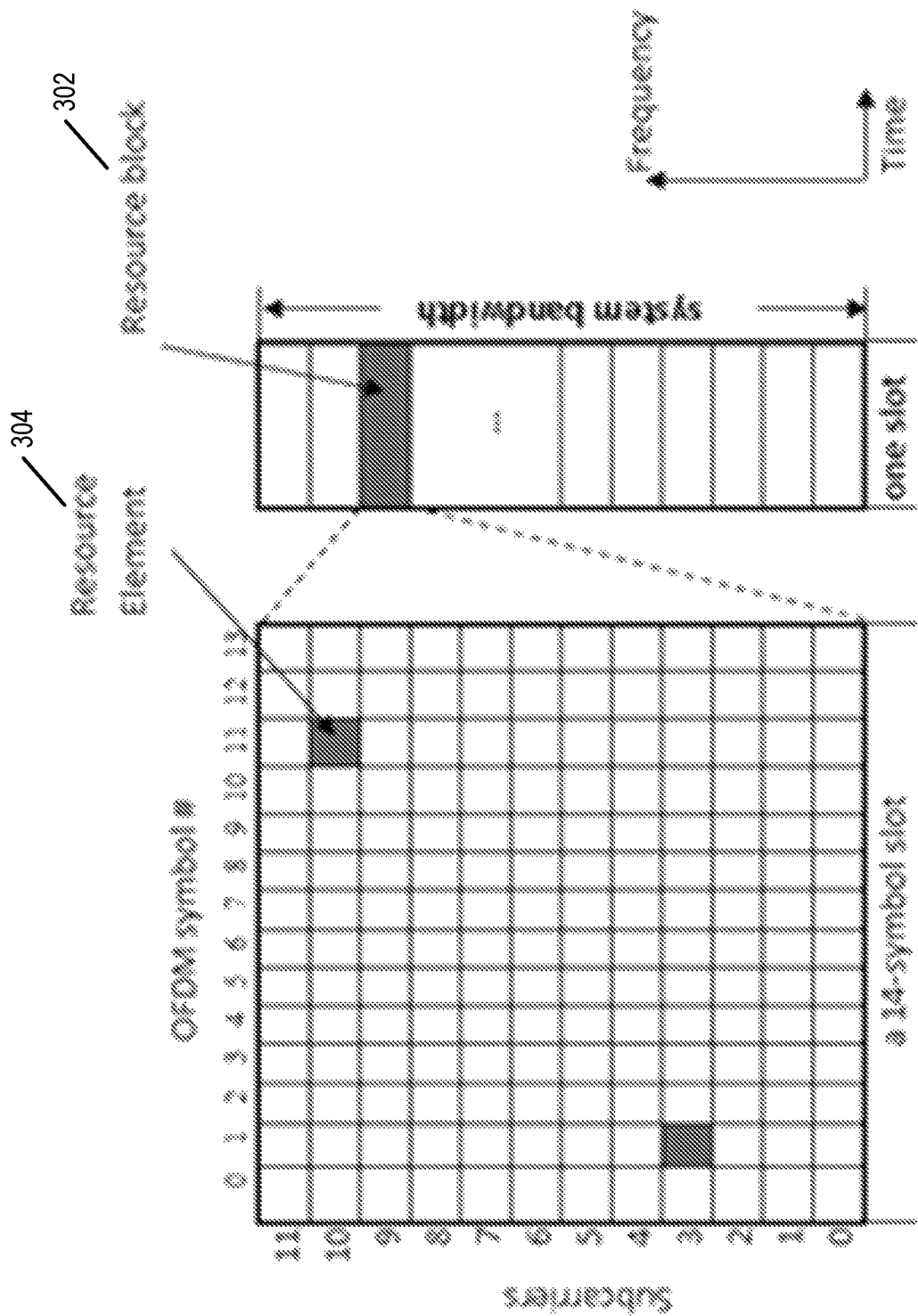
FIG. 3 illustrates a time-frequency grid of new radio physical resources.

Similar to LTE, NR uses OFDM (Orthogonal Frequency Division Multiplexing) in the downlink (i.e., from a network node, gNB, eNB, or base station, to a user equipment or UE). The basic NR physical resource over an antenna port can thus be seen as a time-frequency grid as illustrated in FIG. 3, where a resource block (RB) 302 in a 14-symbol slot is shown. A resource block corresponds to 12 contiguous subcarriers in the frequency domain. Resource blocks are numbered in the frequency domain, starting with 0 from one end of the system bandwidth. Each resource element 304 corresponds to one OFDM subcarrier during one OFDM symbol interval.

Different subcarrier spacing values are supported in NR. The supported subcarrier spacing values (also referred to as different numerologies) are given by $\Delta f=(15\times 2^\alpha)$ kHz where $\alpha \in (0, 1, 2, 3, 4)$. $\Delta f=15$ kHz is the basic (or reference) subcarrier spacing that is also used in LTE.

In the time domain, downlink and uplink transmissions in NR will be organized into equally-sized subframes of 1 ms each, similar to LTE. A subframe is further divided into multiple slots of equal duration. The slot length for subcarrier spacing $\Delta f=(15\times 2^\alpha)$ kHz is $\frac{1}{2}^\alpha$ ms. There is only one slot per subframe at $\Delta f=15$ kHz and a slot consists of 14 OFDM symbols.

Downlink transmissions are dynamically scheduled, i.e., in each slot the gNB transmits downlink control information (DCI) about which UE data is to be transmitted to and which resource blocks in the current downlink slot the data is transmitted on. This control information is typically transmitted in the first one or two OFDM symbols in each slot in NR. The control information is carried on the Physical Control Channel (PDCCH) and data is carried on the Physical Downlink Shared Channel (PDSCH). A UE first detects and decodes PDCCH and if a PDCCH is decoded successfully, it then decodes the corresponding PDSCH based on the decoded control information in the PDCCH. In addition to PDCCH and PDSCH, there are also other channels and reference signals transmitted in the downlink.

Uplink data transmissions, carried on Physical Uplink Shared Channel (PUSCH), are also dynamically scheduled by the gNB by transmitting a DCI. In case of TDD operation, the DCI (which is transmitted in the DL region) always indicates a scheduling offset so that the PUSCH is transmitted in a slot in the UL region.

Uplink-Downlink Configurations in TDD

In TDD, some subframes/slots are allocated for uplink transmissions and some subframes/slots are allocated for downlink transmissions. The switch between downlink and uplink occurs in the so called special subframes (e.g., in LTE) or flexible slots (e.g., in NR). In LTE, seven different uplink-downlink configurations are provided, see Table 1 (where "D" designates subframes for downlink, "U" for uplink, and "S" for special).

TABLE 1

| LTE uplink-downlink configurations (from 36.211, Table 4.2-2) | | | | | | | | | | | |
|---|---|---|---|---|---|---|---|---|---|---|---|
| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The size of the guard period (and hence the number of symbols for DwPTS (downlink transmission in a special subframe) and UpPTS (uplink transmission in a special subframe) in the special subframe) can also be configured from a set of possible selections.

NR on the other hand provides many different uplink-downlink configurations. There are 10 to 320 slots per radio frame (where each radio frame has a duration of 10 ms) depending on subcarrier spacing in some embodiment. For example, as defined in standards such as European Telecommunications Standards Institute (ETSI) Technical Specification (TS) 138 213, entitled "5G; NR; Physical Layer Procedure for Control," dated July 2018 for Release 15, OFDM symbols in a slot are classified as "downlink" (denoted "D"), "flexible" (denoted "X"), or "uplink" (denoted "U"). A semi-static TDD UL-DL configuration may be used where the TDD configuration is radio resource control (RRC) configured using the IE TDD-UL-DL-ConfigCommon:

```
TDD-UL-DL-ConfigCommon ::=                                SEQUENCE {
    - Reference SCS used to determine the time domain boundaries in the UL-DL pattern which must be common
across all subcarrier specific
        - virtual carriers, i.e, independent of the actual subcarrier spacing using for data transmission.
        - Only the values 15 or 30 kHz (<6GHz), 60 or 120 kHz (>6GHz) are applicable.
        - Corresponds to L1 parameter 'reference-SCS' (see 38.211, section FFS_Section)
    referenceSubcarrierSpacing              SubcarrierSpacing
        OPTIONAL,
    - Periodicity of the DL-UL pattern Corresponds to L1 parameter 'DL-UL-transmission-periodicity' (see 38.211,
section FFS_Section)
    dl-UL-TransmissionPeriodicity                 ENUMERATED {ms0p625, ms1, ms1p25, ms2, ms2p5, ms5,
ms10}                                         OPTIONAL,
    - Number of consecutive full DL slow at the beginning of each DL-UL pattern.
    - Corresponds to L1 parameter 'number-of-DL-slots' (see 38.211. Table 4.3.2-1)
    nrofDownlinkSlots                             INTEGER (0..maxNrofSlots)
                                                  OPTIONAL,
    - Number of consecutive DL symbols in the beginning of the slot following the last full DL slot (as derived from
nrofDownlinkSlots).
    - If the field is absent or released, there is no partial-downlink slot
    - Corresponds to L1 parameter 'number-of-DL-symbols-common' (see 38.211, section FFS_Section),
    nrofDownlinkSymbols                           INTEGER (0..maxNrofSymbols-1)
                                                  OPTIONAL,  --Need R
    - Number of consecutive full UL slots at the end of each DL-UL pattern
    - Corresponds to L1 parameter 'number-of-UL-slots' (see 38.211, Table 4.3.2-1)
    nrofUplinkSlots                               INTEGER (0..maxNrofSlots)
                                                  OPTIONAL,
    - Number of consecutive UL symbols in the end of the slot proceding the first full UL slot (as derived from
nrofUplinkSlots)
    - If the field is absent or released, there is no partial-uplink slot.
    - Corresponds to L1 parameter 'number-of-UL-symbols-common' (see 38.211, section FFS_Section)
    nrofUplinkSymbols)                            INTEGER (0..maxNrofSymbols-1
                                                  OPTIONAL  --Need R
```

Or alternatively, the slot format can be dynamically indicated with a Slot Format Indicator (SFI) conveyed with DCI Format 2_0. Regardless if dynamic or semi-static TDD configuration is used in NR, the number of UL and DL slots, as well as the guard period (the number of UL and DL symbols in the flexible slot(s)), may be almost arbitrarily configured within the TDD periodicity. This allows for very flexible uplink-downlink configurations.

Atmospheric Ducting

In certain weather conditions and in certain regions of the world, a ducting phenomenon can happen in the atmosphere. The appearance of the duct is dependent on, for example, temperature and humidity and when it appears it can "channel" the signal to help it propagate a significantly longer distance than if the duct was not present. An atmospheric duct is a layer in which rapid decrease in the refractivity of the lower atmosphere (the troposphere) occurs. In this way, atmospheric ducts can trap the propagating signals in the ducting layer, instead of radiating out in space. Thus, most of the signal energy propagates in ducting layer, which acts as a wave guide. Therefore, trapped signals can propagate through beyond-line-of-sight distances with relatively low path loss, sometimes even lower than in line-of-sight propagation. A ducting event is typically temporary and can have a time duration from a couple of minutes to several hours.

Figure 4:
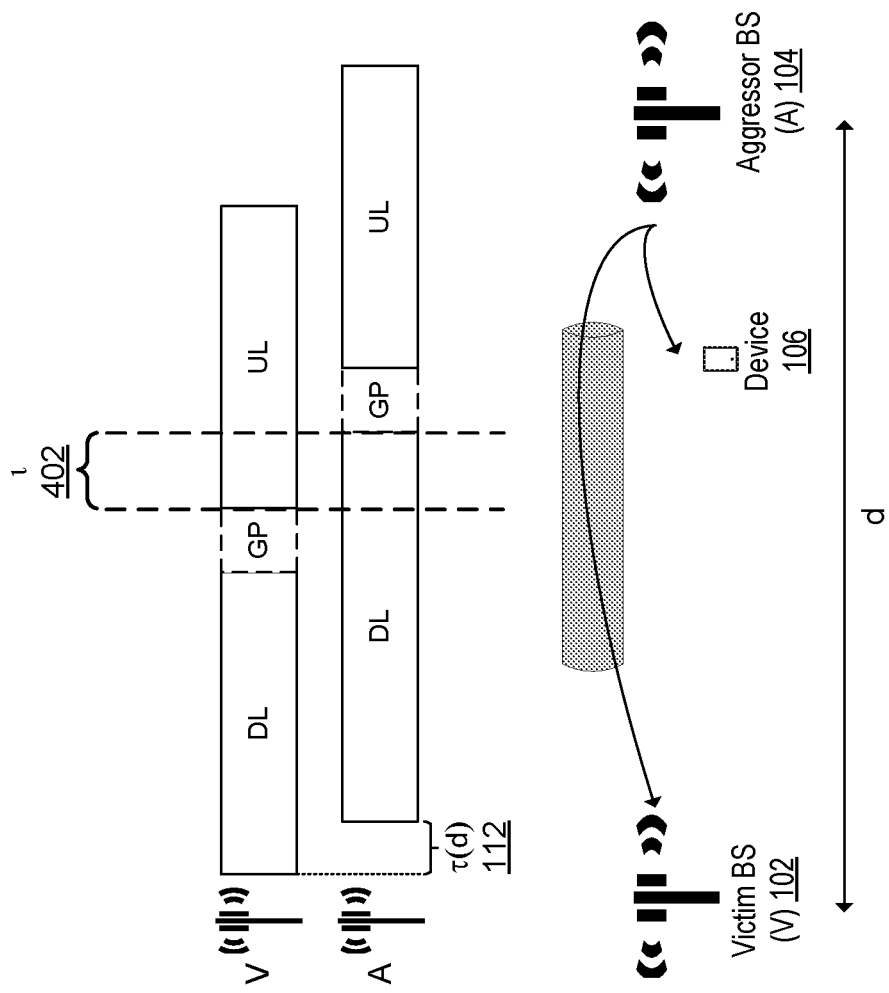
FIG. 4 illustrates downlink-to-uplink interference at the presence of atmospheric duct.

Environmental factors such as Atmospheric ducting presents challenges to remote interference management. For example, due to the inherent properties of the TDD system design and the presence of an atmospheric duct, the distance d between an aggressor BS that interferes with a victim BS, can be large. Since ducting only appears in certain parts of the world under certain conditions, this has typically not been considered in design of cellular systems using unpaired spectrum. Consequently, a DL transmission can suddenly enter the UL region as interference (i) at reference 402, as illustrated in FIG. 4.

One way to detect interference between BSs is for the victim BS (e.g., a BS that has detected it is being interfered due to atmospheric ducting) to send a specific RS that can be detected by an aggressor BS. The aggressor BS can then adapt its transmission to avoid the interference situation. One such adaptation is to, for example, blank, or reduce the duration of its downlink transmission, effectively increasing the guard period.

In some proposed solutions, a number of victims, assigned to the same reference signal group (RSG) transmit the same RS simultaneously. Due to the fact that a single aggressor BS (or group of aggressor BSs) may interfere thousands of BSs, scattered over a large geographical area, if grouping is done randomly or no grouping is done at all, it may occur that multiple copies of the RS (each copy sent by one victim BS) mutually interfere at the receiving BS (possibly with a large delay spread), making the RS undecodable.

Base Station (BS) Grouping

Certain aspects of the present disclosure and their embodiments may provide solutions to these or other challenges. For example, there is proposed herein a mechanism for grouping BSs. The grouping is based on information provided by the BSs when detecting remote interference. The BSs may be grouped into RSGs in a way that increases the robustness of the RS. A mechanism for grouping BSs involved in a remote interference scenario, based on information provided by the BSs when detecting remote interference, in a way that increases the robustness of the reception of the RS. In particular embodiments, a group of one or more victim BS detects interfering signal from one or more aggressor BSs. Each victim BS notifies its respective core network node in charge of management (e.g., an MM node) that it is subject to interference by one or more aggressor BSs. The notification contains information for assisting the network in grouping BS. The information is referred to as grouping assistance information (GAI) in the present disclosure. Based on the received GAI, the management node performs grouping of the victim BSs into reference signal groups (RSGs). An RSG can comprise one or more victim BSs. All BSs that are assigned the same RSG ID may transmit the same RS sequence towards the aggressor simultaneously, at predefined occasions. Depending on the scenario/embodiment, the grouping of RS can also be performed at the aggressor BSs. One of the reasons for sending an RS from aggressor to victim is to let the victim assess the remote interference (RI) impact.

As known by persons in the art, the remote interference may not be static. For example, the atmospheric ducting may change based on weather, and the remote interference caused by the changing atmospheric ducting will consequently change. Thus, the grouping of either the victim or aggressor BSs may be adjusted based on changing remote interference.

Certain embodiments may provide one or more of the following technical advantages. For example, some of the benefits of intelligent GAI-base grouping of victim/aggressor RS transmissions may include:
  the reduction of RSG space and RSG ID size, resulting in:
    the possibility to repeat the transmission of each RS sequence more frequently,
    improved (i.e., reduced) reaction time of the network to RI;
  a more accurate RS detection at receiving BS—all BS belonging to the same RSG simultaneously transmit the RS, thus boosting the received power of the RS;
  a reduced number of overlapping RS sequences in the detection process, and less RS sequences to distinguish between (i.e., smaller sequence codebook).

Note that the invention may be explained using the next-generation radio access network (NG-RAN) and next-generation core (NGC), where gNB is taken as an example of base station, and Access and Mobility Management Function (AMF) is an example of a management node (e.g., MM node). Embodiments of the invention are applicable to other scenarios as well.

Grouping of Victim Base Station

Figure 5:
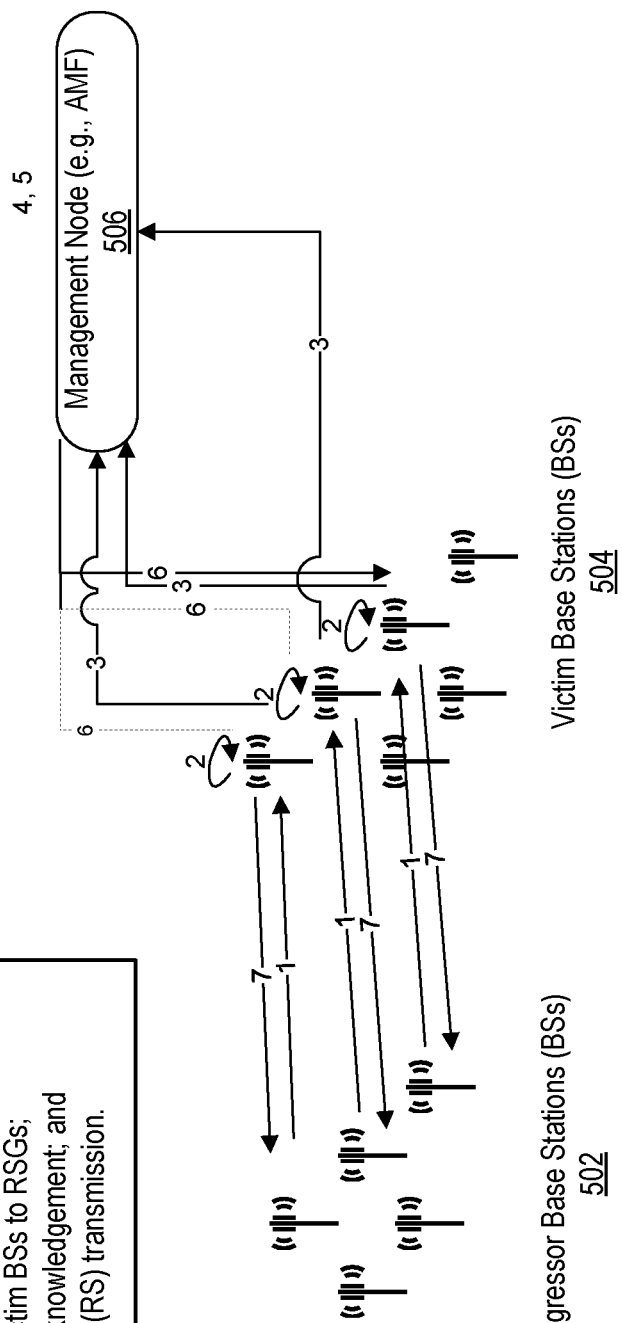
FIG. 5 illustrates operations of grouping victim base stations per some embodiments of the invention.

The victim base station may be grouped in some embodiments. FIG. 5 illustrates operations of grouping victim base stations per some embodiments of the invention. The network 500 includes a group of aggressor base stations 502 and a group of victim base stations 504. Using gNB as an example, the grouping of victim base stations may include several operations, including remote interference detection, assembling remote interference (RI) notification message, RI notification message transmission, RI notification message collection, assignment of victim gNBs to one or more RSGs, RI notification acknowledgement, and RS transmission, as enumerated as Steps 1 to 7 at reference 550 in the figure.

Remote Interference Detection

At Step 1, a group of one or more victim base stations 504 (e.g., gNBs) detects an interfering signal from one or more aggressor base stations 502 (e.g., gNB). Since in the general case it cannot be assumed that an aggressor base station has detected that it is an aggressor, it cannot be assumed that the aggressor has started any RS transmission as part of a RIM framework. Thus, the interfering signal from the aggressor base station is likely a regular PDSCH/PDCCH transmission. Also in general, the one or more victim base stations may receive remote interference from several aggressor base stations, where the interfering signals will add up at the receiver. Thus, it is not certain that victim base stations can distinguish how many interfering signals are received, merely that one or more interfering signals are present.

The victim base stations may however estimate:
  the power-level of remote interference as a function of propagation delay by, for instance, estimating interference-over-thermal levels on each UL OFDM symbol,
  the angular spectrum of the remote interference in each time instance (e.g., OFDM symbol), which may be used to estimate the main angle-of-arrival (AoA) and the angular spread of the aggregate signal.

Based on these two estimates, the victim base stations may estimate the number of interfering aggressor base stations, their respective propagation delay, respective received power level, and respective angle-of-arrival, albeit with some level of uncertainty.

Assembling Remote Interference (RI) Notification Message

In order to notify the network that it is subject to remote interference (from one or more aggressor gNBs), each victim base station (e.g., gNB) may assemble a remote interference (RI) notification message containing grouping assistance information (GAI) at Step 2. The content of the GAI is discussed elsewhere in this disclosure.

Remote Interference (RI) Notification Message Transmission

At Step 3, each victim base station (e.g., gNB) sends the RI notification message to its respective AMF (and/or another node in charge of management).

Remote Interference (RI) Notification Message Collection

A management node 506 (e.g., an AMF and/or another node in charge of management in the wireless network) of the victim base station 504 may collect the RI notification messages from the victim base stations and extract the GAI at Step 4.

Assignment of Victim gNBs to One or More Reference Signal Groups (RSGs)

Based on the GAI extracted from the RI notification messages received, the management node 506 (e.g., an AMF node and/or the other node in charge of management) may assign the victim base stations (gNBs) into one or several RSGs at Step 5. That is, the management node 506 (e.g., an AMF node and/or the other node in charge of management) may assign a set of gNBs the same RSG ID, which implies that the set of gNBs shall transmit the RIM RS at the same time occasion using the same RS sequence. The assignment of RSG ID may be such that the delay spread of a RS simultaneously transmitted by all victim gNBs in an RSG is sufficiently low so that an aggressor gNB would be able to successfully detect the RS with high probability. For instance, this may be achieved by grouping victim gNBs which are experiencing RI arriving with similar propagation delay and/or angle-of-arrival, and which are sufficiently close to each other geographically.

RI Notification Acknowledgement

For every victim base station (e.g., gNB), the management node 506 (e.g., an AMF node and/or the other node in charge of management) may assemble a dedicated RI notification acknowledgement message at Step 6, containing the RSG ID assigned to the receiving base station (e.g., gNB).

RS Transmission

Each victim base station (e.g., gNB) may transmit the RS sequence on the physical resources defined for its assigned RSG ID (i.e., there is a predefined mapping between RSG ID and which RS sequence and mapping to physical resources to use) at Step 7, where the transmission instance is determined based on the RSG ID. All victim base stations (e.g., gNBs) that are assigned the same RSG ID may transmit the RS simultaneously, at predefined occasions.

It should be noted that although the advantage gained is pronounced when the RSG includes a big set of gNBs, a gain still exists in the case of a single gNB in the RSG. It should also be noted that the functionality described in the core network need not be carried out by AMF but another existing node (e.g., an operations, administration, and maintenance (OAM) node) in a core network. Additionally, the functionality could also, for example, be carried out by a newly defined node, solely defined for remote interference mitigation purposes. The newly defined node may be the management node for the wireless network.

In one embodiment, after receiving the RI notification message from one of its affiliated gNBs, the AMF and/or the other node in charge of management may poll all of its gNBs for RI notification messages.

In one embodiment, one victim gNB collects all RI notification messages received from other victim gNBs over the Xn interface instances, aggregates them into a single RIM notification message and sends this aggregated message to the victim gNB's AMF and/or the other node in charge of management. In one embodiment, a gNB-NU of a victim gNB collects the RI notification messages from its gNB-DU over an interface (e.g., F1 interface) and aggregates them in the single RIM notification message.

In one embodiment, for the scenario where the gNBs affected by RI are affiliated to different AMFs (or nodes in charge of management), the victim gNBs send the RI notification messages to a dedicated AMF (or a dedicated management node) in charge of assigning RSG IDs.

In one embodiment, the AMF and/or the other node in charge of management may, based on the GAI, performs separation of all victim gNBs that reported the RI into two or more RSGs, where each RSG may consist of as little as a single gNB. One possible reason for this could be that a small number of gNBs has reported RI to their common AMF, but the GAI values received by the AMF (or another node in charge of management) from individual gNBs are significantly different.

Grouping Assistance Information (GAI)

In one embodiment, the GAI includes different types of information, where in its simplest form, the GAI could only include information that a base station is being interfered.

In one embodiment, the GAI includes geographical coordinates of the antenna(s) of the base station.

In one embodiment, assuming perfect timing synchronization of the entire network, the GAI includes estimate of the propagation delay of the interfering signal.

In one embodiment, the GAI includes estimate of the angle of arrival of the interfering signal.

In one embodiment, the GAI contains information on the signal level and/or estimated interference slope over time and/or estimated SINR of the RI detected.

Grouping of Aggressor Base Stations

In one embodiment, RSGs can be formed by grouping of aggressor base stations such as gNBs. For example, the aggressor base stations interfere the victim base stations, which report the interference to a management node. The management node assigns the victim base stations into one or several groups as discussed above relating to FIG. 5. The victim base stations send out their respective reference signal (RS) sequences. Aggressor base stations receive the RS sequences and report to the management node. The management node groups the aggressor base stations based on the reports from the aggressor base stations, and all aggressor base stations in a group sends the same RS sequence of their own.

One of the benefits of grouping aggressor base stations is the decrease in the total ID space required to identify them, which in turn can improve reaction times of the network. One of the reasons for the RS transmission from aggressor to victim is to let the victim assess the impact of the RI. In the aggressor grouping case, aggressor base stations would have more information since they could detect the RSs transmitted by the victims, rather than just blindly detecting PDSCH interference, so the content of the GAI may vary compared to the case of grouping victim base stations.

In one embodiment, AMF and/or the other node in charge of management (MM) informs only one base station or one set of base stations in the set to transmit this RS from aggressor to the victim for the victims to assess the impact of RI. This reduces the number of RS transmitted and will improve network efficiency.

Some Embodiments

Figure 6:
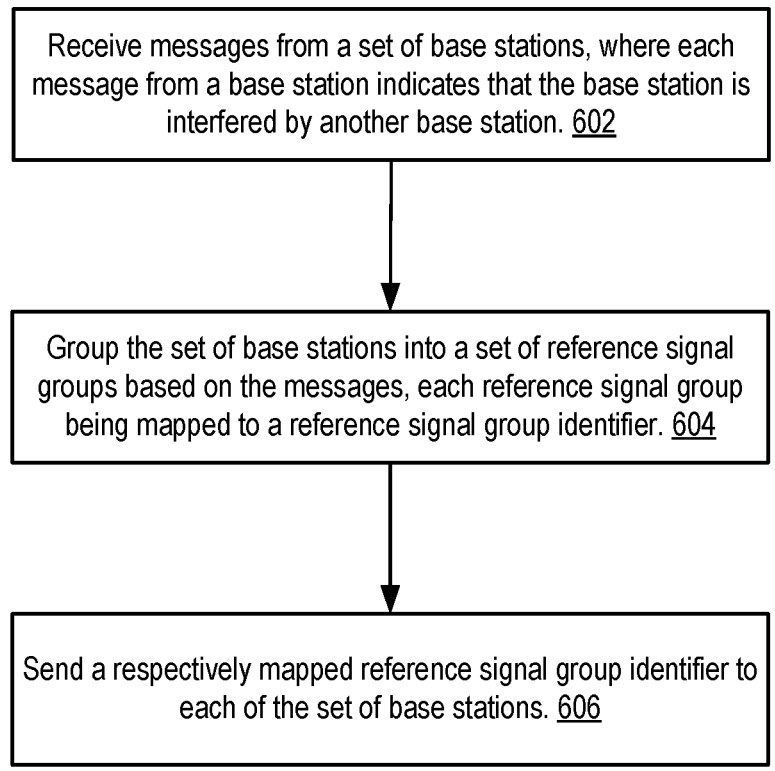
FIG. 6 is a flow diagram illustrating operations for remote interference management per some embodiments of the invention.

FIG. 6 is a flow diagram illustrating operations for remote interference management per some embodiments of the invention. The operations in the figure may be performed by a node in charge of management in a wireless network. For example, the node in charge of management may be the management node 506.

At reference 602, the management node may receive messages from a set of base stations, where each message from a base station indicates that the base station is interfered by another base station. At reference 604, the management node groups the set of base stations into a set of reference signal groups based on the messages, each reference signal group being mapped to a reference signal group identifier. At reference 606, the management node sends a respectively mapped reference signal group identifier to each of the set of base stations. Note that the set of reference signal groups may include a plurality of reference signal groups, some of which may include a single base station (e.g., a single gNB as discussed herein above) while the other one or more reference signal groups each includes a plurality of base stations.

In one embodiment, base stations sharing a same reference signal group identifier are to transmit a same reference signal sequence assigned to the corresponding reference signal group.

In one embodiment, the other base station interfering the base station is grouped into a group of aggressor base stations that cause interferences to the set of base stations, wherein the grouping is based on messages received from one or more of the set of base stations indicating that they are interfered. The group of aggressor base stations shares a same aggressor group identifier in one embodiment. The group of aggressor base stations are to transmit a same reference signal sequence assigned to the same aggressor group identifier.

In one embodiment, each of the set of base station is a next generation node B (gNB). In one embodiment, each base station within the group of aggressor base stations is a gNB.

In one embodiment, the message received by the management node at reference 602 indicates one or more characteristics of an interference signal causing the interference, wherein the characteristics include: propagation delay of the interference signal, an angle of arrival of the interference signal, and a signal level of the interference signal. In one embodiment, the message indicates a physical location of the base station.

In one embodiment, the respectively mapped reference signal group identifier is included in an acknowledgement for the message from the base station.

In one embodiment, the base stations sharing a same reference signal group identifier are selected into the same reference signal group based on that delay spread of the reference signal sequence transmissions by the base stations is within a range.

Figure 7:
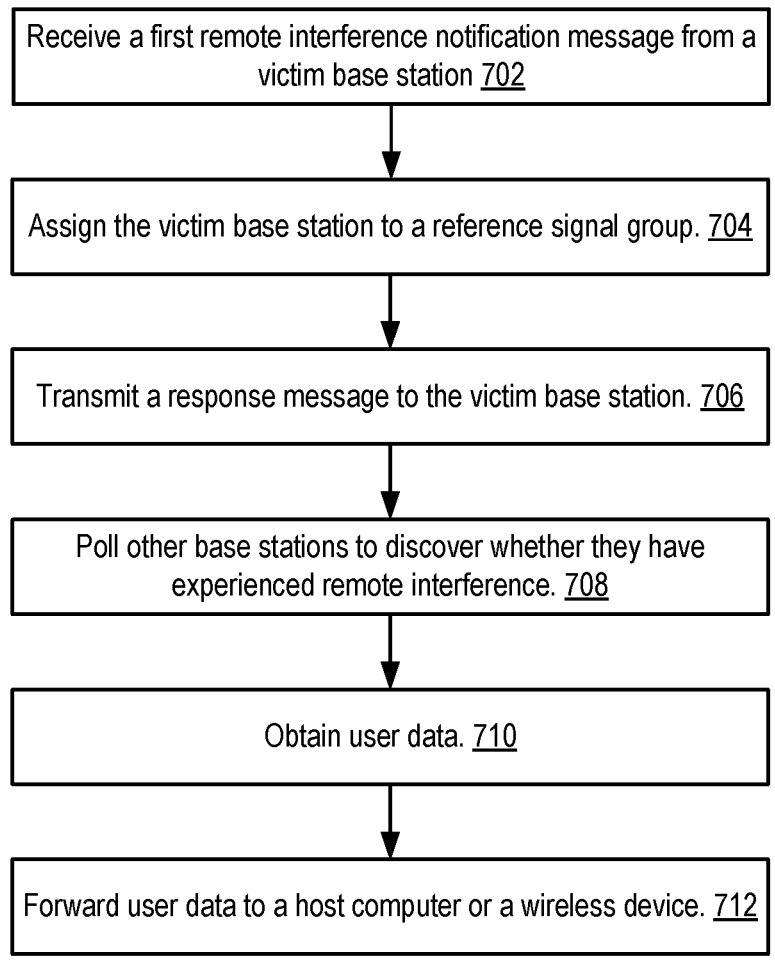
FIG. 7 depicts a method of remote interference management in accordance with particular embodiments.

FIG. 7 depicts a method of remote interference management in accordance with particular embodiments. The method begins at step 702 with a network node (such as an AMF network node or a base station) receiving a first remote interference notification message. The message may be received from a victim base station. The victim base station may be one of a plurality of victim base stations. In some embodiments, the remote interference notification message includes grouping assistance information. In some embodiments, the first remote interference notification message comprises an indication of a plurality of victim base stations experiencing remote interference. In some embodiments, the network node may receive additional remote interference notification messages from other victim base stations. In some embodiments, and depending on configuration, the first remote interference message may comprise one or more of the following pieces of information: that the victim base station is being interfered with; geographical coordinates associated with the victim base station; an estimate of the propagation delay of an interfering signal; an estimate of the angle of arrival of the interfering signal; information on a signal level of the interfering signal; an estimate of the interference slope over time caused by the interfering signal; and/or an estimate of the Signal to Interference and Noise Ratio (SINR) of the interfering signal.

Then, at step 704 the network node assigns the victim base station to a reference signal group based on information in the remote interference notification message. Each base station of the reference signal group may be configured to transmit a reference signal in the same time occasion using the same reference signal sequence. In some embodiments, each base station in the reference signal group may experience similar remote interference. For example, remote interference arriving with similar propagation delay and/or angle-of-arrival. In some embodiments, the base stations of a reference signal group may be sufficiently close to each other geographically. In some embodiments, the reference signal group has an associated physical resource defined which can be used by the victim base station when transmitting a reference signal. In some embodiments, the network node may also, or alternatively, include one or more aggressor base stations in an aggressor reference signal group.

At step 706 the network node transmits a response message to the victim base station. The response message includes an identifier associated with the reference signal group.

In some embodiments, at step 708 the network node may, upon receiving the first remote interference notification message, poll a plurality of other base stations to discover whether they have experienced remote interference.

At step 710 the network node obtains user data and then at step 712 the network node forwards the user data to a host computer or a wireless device.

Figure 8:
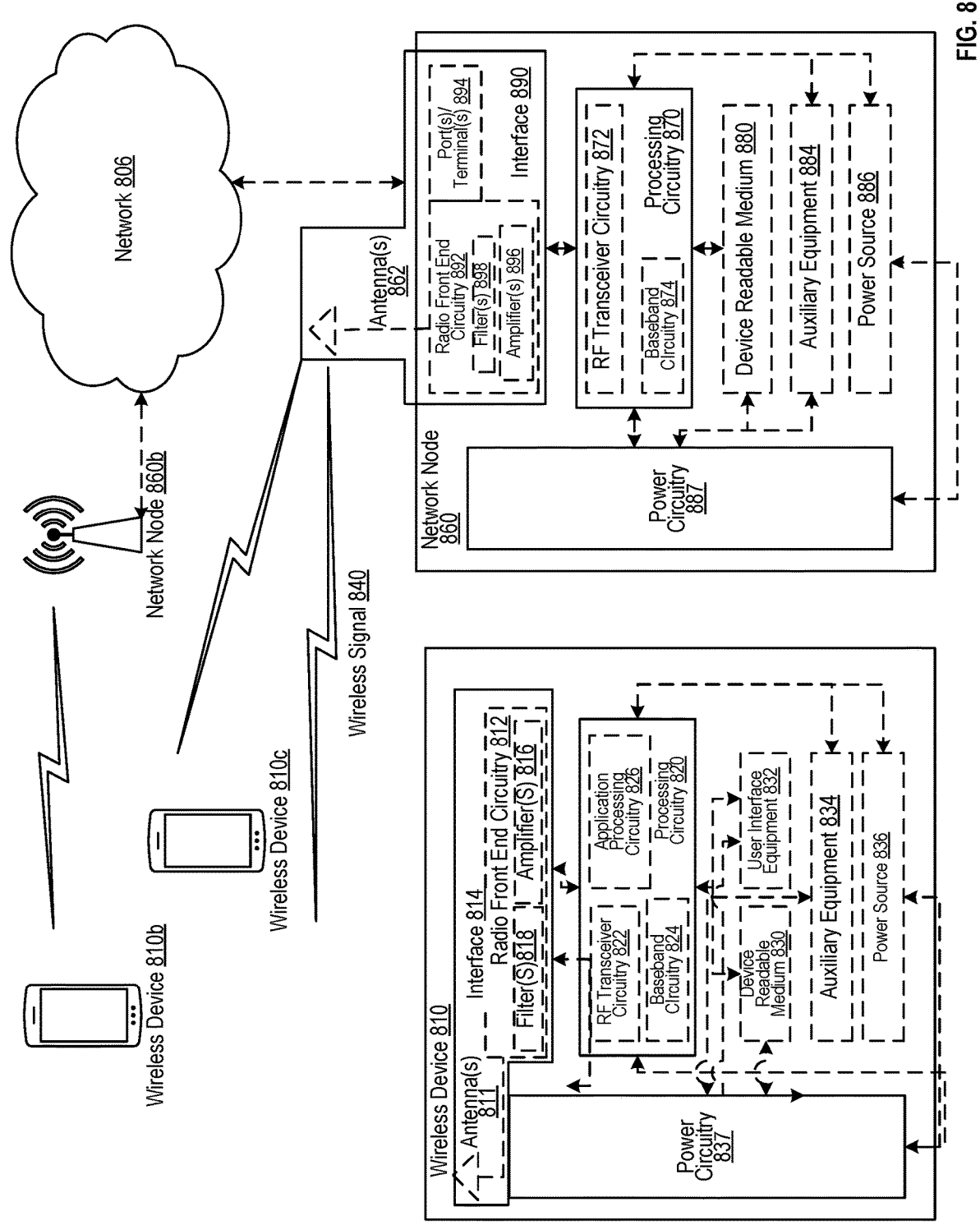
FIG. 8 shows a wireless network per some embodiments of the invention.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860*b*, and WDs 810, 810*b*, and 810*c*. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network. The network node 860 may include a management node such as the management node 506.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the Institute of Electrical and Electronics Engineers (IEEE) 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR base stations (BSs), network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860 but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signaling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as multiple-input and multiple-output (MIMO). In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820 and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810 and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
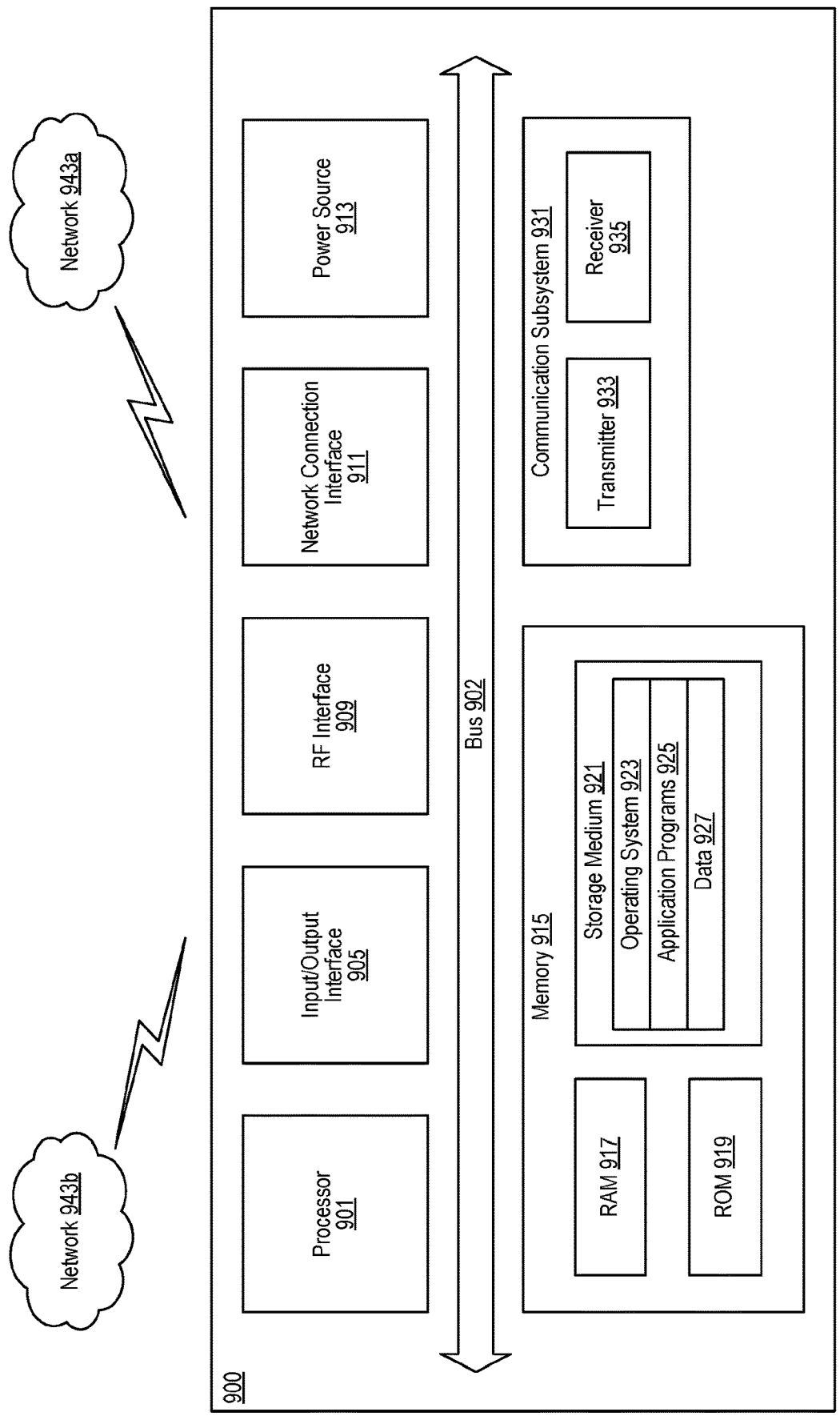
FIG. 9 shows a user equipment per some embodiments of the invention.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 9200 may be any UE identified by 3GPP, including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943a. Network 943a may encompass wired and/or wireless networks such as a local-area network (LAN), a wide-area network (WAN), a computer network, a wireless network, a telecommunications network, another like network or any combination thereof. For example, network 943a may comprise a Wi-Fi network. Network connection interface 911 may be configured to include a receiver and a transmitter interface used to communicate with one or more other devices over a communication network according to one or more communication protocols, such as Ethernet, TCP/IP, Synchronous optical network (SONET), ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943b using communication subsystem 931. Network 943a and network 943b may be the same network or networks or different network or networks. Communication subsystem 931 may be configured to include one or more transceivers used to communicate with network 943b. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UMTS Terrestrial Radio Access Network (UTRAN), WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943b may encompass wired and/or wireless networks such as a local-area network (LAN), a wide-area network (WAN), a computer network, a wireless network, a telecommunications network, another like network or any combination thereof. For example, network 943b may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
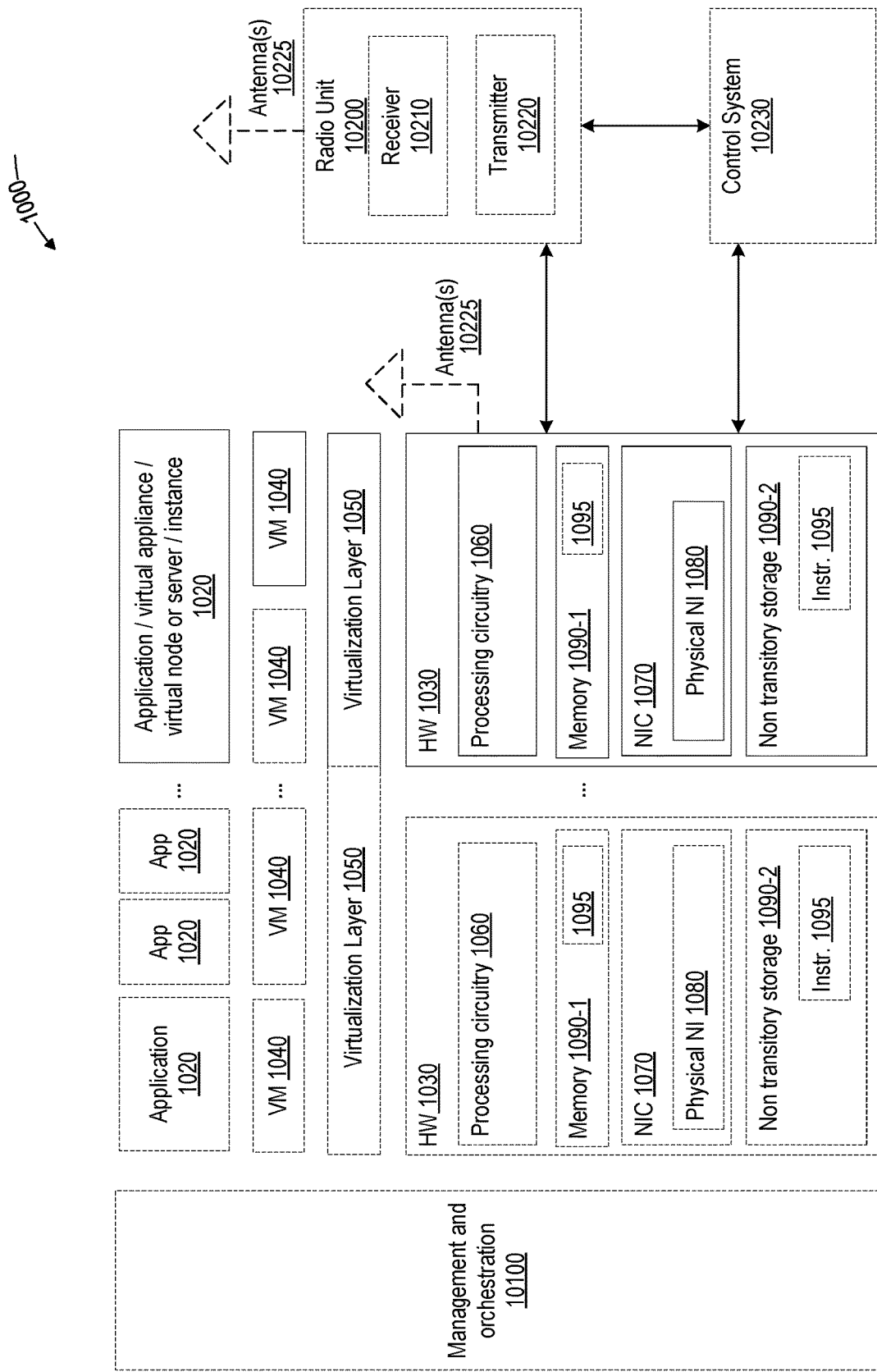
FIG. 10 shows a virtualization environment per some embodiments of the invention.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g., in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signaling can be effected with the use of control system 10230 which may alternatively be used for communication between the hardware nodes 1030 and radio units 10200.

Figure 11:
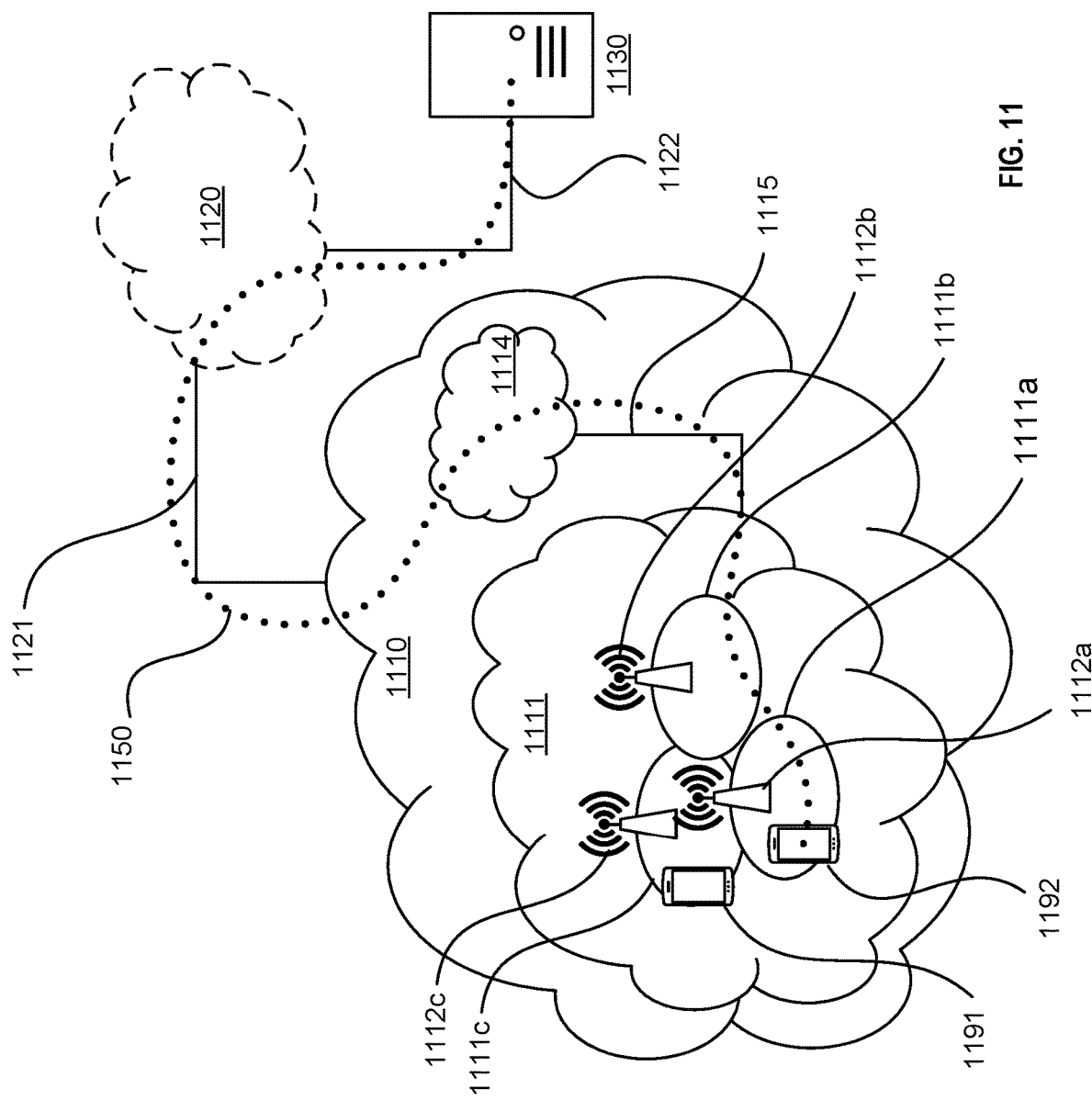
FIG. 11 shows a telecommunication network connected via an intermediate network to a host computer per some embodiments of the invention.

With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

Figure 12:
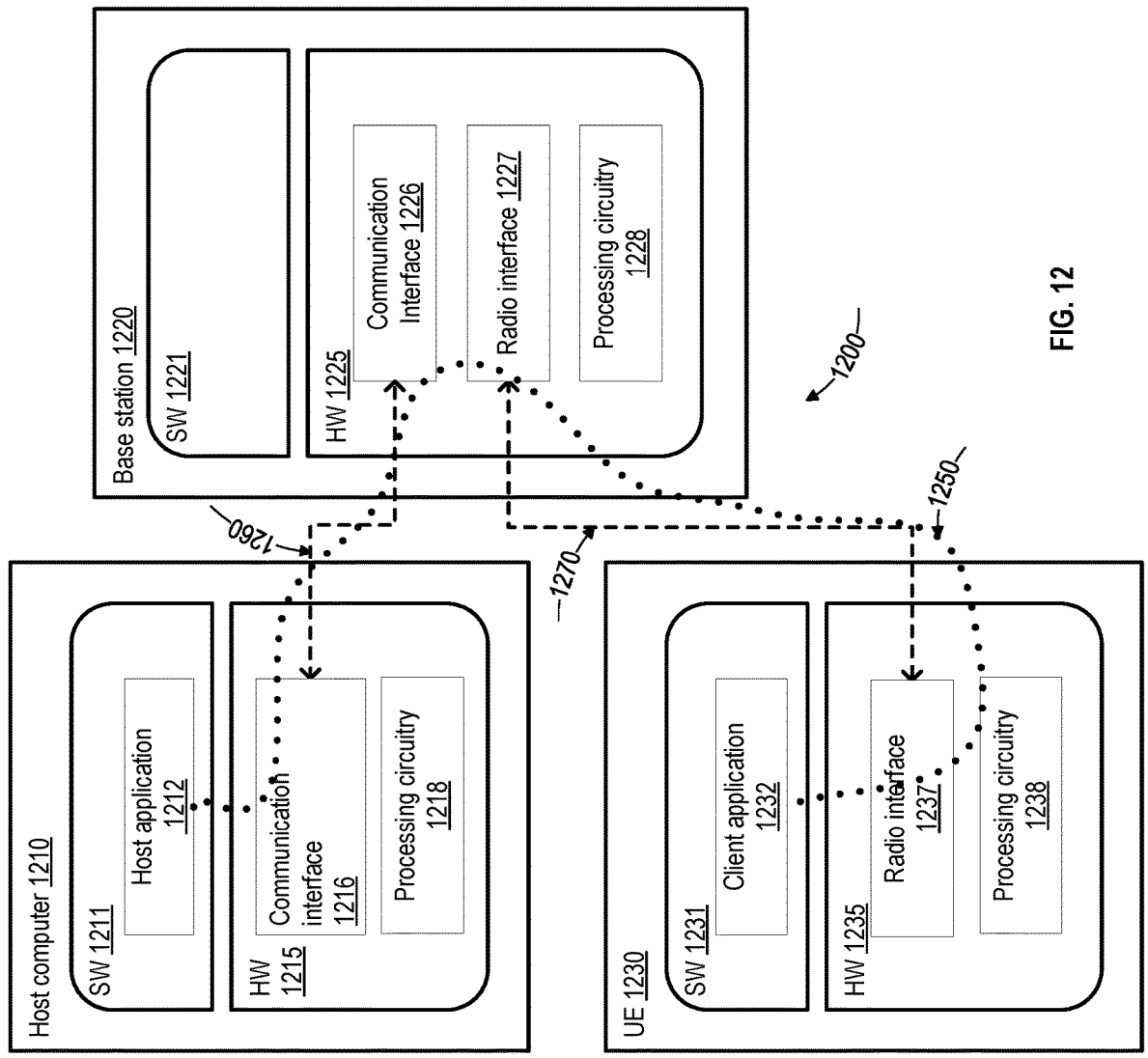
FIG. 12 shows a host computer communicating via a base station with a user equipment over a partially wireless connection per some embodiments of the invention.

It is noted that host computer 1210, base station 1220 and UE 1230 illustrated in FIG. 12 may be similar or identical to host computer 1130, one of base stations 1112a, 1112b, 1112c and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the interference handling of base stations and thereby provide benefits such as improved signal quality, which in turn provides a better user experience (e.g., when streaming content).

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figure 13:
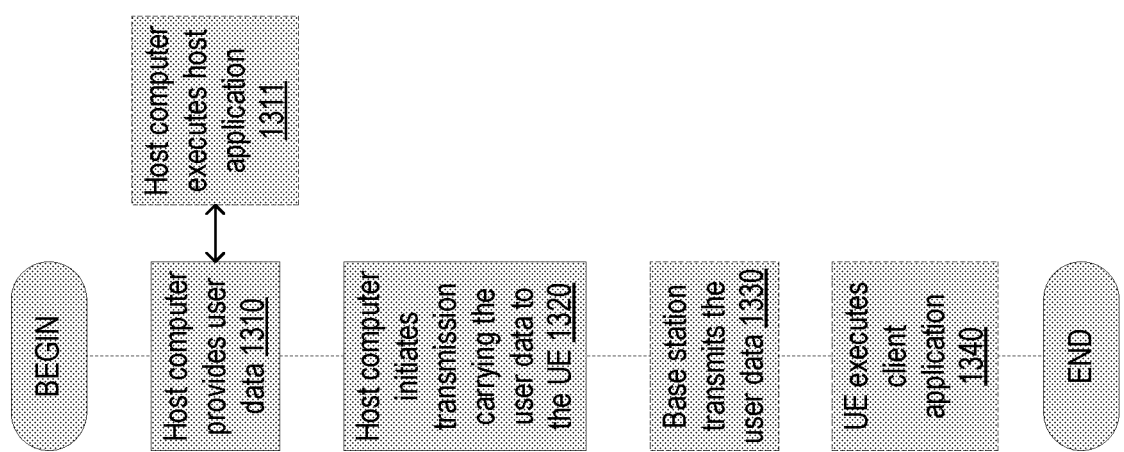
FIG. 13 shows a method implemented in a communication system including a host computer, a base station, and a user equipment per some embodiments of the invention.

FIG. 13 is a flowchart illustrating a method implemented in a communication system per some embodiments of the invention. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

Figure 14:
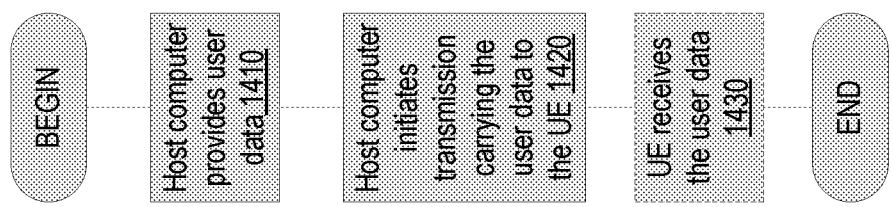
FIG. 14 shows a method implemented in a communication system including a host computer, a base station, and a user equipment per some embodiments of the invention.

FIG. 14 is a flowchart illustrating a method implemented in a communication system per some embodiments of the invention. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figure 15:
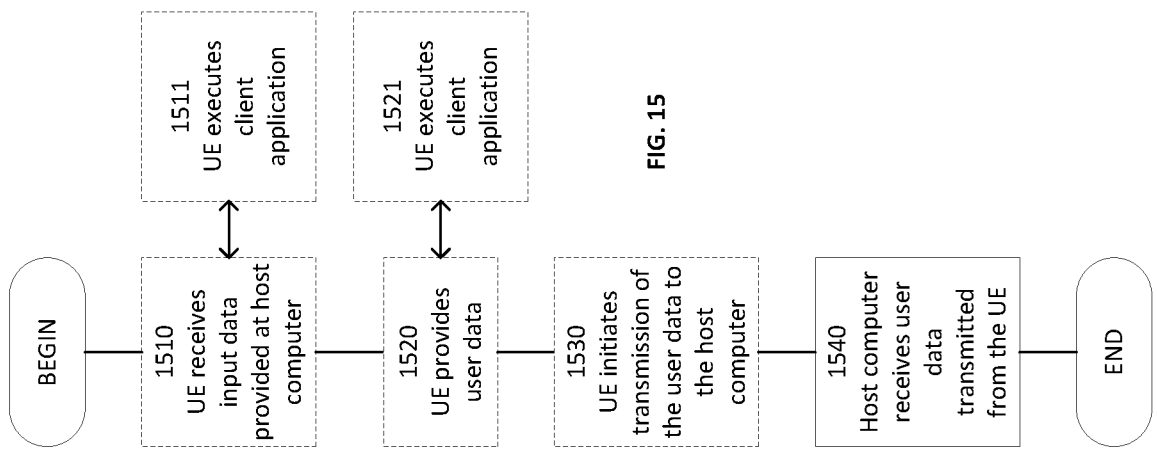
FIG. 15 shows a method implemented in a communication system including a host computer, a base station, and a user equipment per some embodiments of the invention.

FIG. 15 is a flowchart illustrating a method implemented in a communication system per some embodiments of the invention. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

Figure 16:
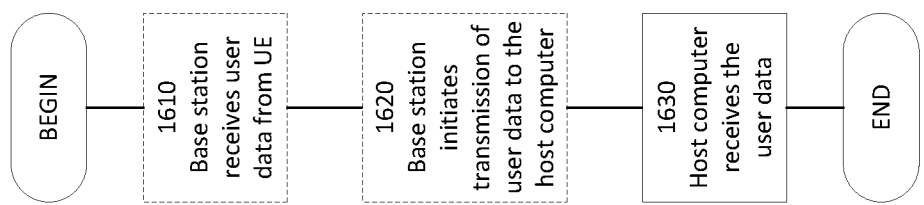
FIG. 16 shows a method implemented in a communication system including a host computer, a base station, and a user equipment per some embodiments of the invention.

FIG. 16 is a flowchart illustrating a method implemented in a communication system per some embodiments of the invention. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as those that are described herein.

EMBODIMENTS

Group A Embodiments

1. A method performed by a wireless device for grouping base stations experiencing remote interference, the method comprising:
   receiving from a first network node a first grant specifying one or more wireless resources to be used for communicating with the first network node; and
   receiving from the first network node a second grant specifying one or more different wireless resources to be used for communicating with the first network node, wherein the second grant was received in response to the first network node receiving remote interference from a second network node.
2. The method of 1, wherein the first network node and the second network node are associated with a first cell and a second cell, respectively, wherein the first cell and the second cell are not geographically adjacent to one another.
3. The method of 1, wherein the wireless device does not detect a reference signal sent by the second network node.
4. The method of any of the previous embodiments, further comprising:
   providing user data; and
   forwarding the user data to a host computer via the transmission to the base station.

Group B Embodiments

5. A method performed by a network node for grouping base stations experiencing remote interference, the method comprising:
   receiving a first remote interference notification message from a victim base station;
   assigning the victim base station to a reference signal group based on information in the remote interference notification message, wherein each base station of the reference signal group transmits a reference signal in the same time occasion using the same reference signal sequence; and
   transmitting a response message to the victim base station, the response message comprising an identifier associated with the reference signal group.
6. The method of 5 wherein the remote interference notification message includes grouping assistance information.
7. The method of 5-6 wherein each base station in the reference signal group are experiencing remote interference arriving with similar propagation delay and/or angle-of-arrival, and which are sufficiently close to each other geographically.
8. The method of 5-7 wherein the reference signal group has an associated physical resource defined which can be used by the victim base station when transmitting a reference signal.
9. The method of 5-8 further comprising, upon receiving the first remote interference notification message, polling a plurality of other base stations to discover whether they have experienced remote interference.
10. The method of 5-9 wherein the network node is a second victim base station.
11. The method of 5-9 wherein the network node is an Access and Mobility Management Function (AMF) network node.
12. The method of 5-11 wherein the first remote interference notification message comprises an indication of a plurality of victim base stations experiencing remote interference.
13. The method of 5-12 wherein first remote interference message comprises one or more of the following pieces of information:
   that the victim base station is being interfered with;
   geographical coordinates associated with the victim base station;
   an estimate of the propagation delay of an interfering signal;
   an estimate of the angle of arrival of the interfering signal;
   information on a signal level of the interfering signal
   an estimate of the interference slope over time causing be the interfering signal;
   an estimate of the Signal to Interference and Noise Ratio (SINR) of the interfering signal.
14. The method of 5-12 wherein one or more aggressor base stations are included in an aggressor reference signal group.
15. The method of any of the previous embodiments, further comprising:
   obtaining user data; and
   forwarding the user data to a host computer or a wireless device.

Group C Embodiments

16. A wireless device for grouping base stations experiencing remote interference, the wireless device comprising:
   processing circuitry configured to perform any of the steps of any of the Group A embodiments; and
   power supply circuitry configured to supply power to the wireless device.
17. A base station for grouping base stations experiencing remote interference, the base station comprising:
   processing circuitry configured to perform any of the steps of any of the Group B embodiments;
   power supply circuitry configured to supply power to the base station.
18. A user equipment (UE) for grouping base stations experiencing remote interference, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

19. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

20. The communication system of the previous embodiment further including the base station.

21. The communication system of the previous 2 embodiments, further including the UE, wherein the UE is configured to communicate with the base station.

22. The communication system of the previous 3 embodiments, wherein:

the processing circuitry of the host computer is configured to execute a host application, thereby providing the user data; and the UE comprises processing circuitry configured to execute a client application associated with the host application.

23. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

24. The method of the previous embodiment, further comprising, at the base station, transmitting the user data.

25. The method of the previous 2 embodiments, wherein the user data is provided at the host computer by executing a host application, the method further comprising, at the UE, executing a client application associated with the host application.

26. A user equipment (UE) configured to communicate with a base station, the UE comprising a radio interface and processing circuitry configured to performs the of the previous 3 embodiments.

27. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

28. The communication system of the previous embodiment, wherein the cellular network further includes a base station configured to communicate with the UE.

29. The communication system of the previous 2 embodiments, wherein:

the processing circuitry of the host computer is configured to execute a host application, thereby providing the user data; and the UE's processing circuitry is configured to execute a client application associated with the host application.

30. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

31. The method of the previous embodiment, further comprising at the UE, receiving the user data from the base station.

32. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

33. The communication system of the previous embodiment, further including the UE.

34. The communication system of the previous 2 embodiments, further including the base station, wherein the base station comprises a radio interface configured to communicate with the UE and a communication interface configured to forward to the host computer the user data carried by a transmission from the UE to the base station.

35. The communication system of the previous 3 embodiments, wherein:

the processing circuitry of the host computer is configured to execute a host application; and the UE's processing circuitry is configured to execute a client application associated with the host application, thereby providing the user data.

36. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

37. A method implemented in a communication system including a host computer, a base station and a user equipment (UE), the method comprising:

at the host computer, receiving user data transmitted to the base station from the UE, wherein the UE performs any of the steps of any of the Group A embodiments.

38. The method of the previous embodiment, further comprising, at the UE, providing the user data to the base station.

39. The method of the previous 2 embodiments, further comprising:

at the UE, executing a client application, thereby providing the user data to be transmitted; and at the host computer, executing a host application associated with the client application.

40. The method of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

41. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

42. The communication system of the previous embodiment further including the base station.

43. The communication system of the previous 2 embodiments, further including the UE, wherein the UE is configured to communicate with the base station.

44. The communication system of the previous 3 embodiments, wherein:

the processing circuitry of the host computer is configured to execute a host application;

the UE is configured to execute a client application associated with the host application, thereby providing the user data to be received by the host computer.

45. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

46. The method of the previous embodiment, further comprising at the base station, receiving the user data from the UE.

47. The method of the previous 2 embodiments, further comprising at the base station, initiating a transmission of the received user data to the host computer.

What is claimed is:

1. A method for remote interference management (RIM) implemented in a network device in charge of management in a wireless network, the method comprising:

receiving messages from a set of base stations, wherein each message from a base station of the set of base stations indicates that the base station is interfered;

grouping the set of base stations into a set of reference signal groups based on the messages, each reference signal group being mapped to a reference signal group identifier; and sending a respectively mapped reference signal group identifier to each of the set of base stations wherein base stations sharing a same reference signal group identifier are to transmit a same reference signal sequence assigned to a corresponding reference signal group.

2. The method of claim 1, wherein interference is caused by another base station, which is grouped into a group of aggressor base stations that cause interferences to the set of base stations, wherein the grouping is based on messages received from one or more of the set of base stations indicating that they are interfered.

3. The method of claim 2, wherein the group of aggressor base stations shares a same aggressor group identifier.

4. The method of claim 3, wherein the group of aggressor base stations are to transmit a same reference signal sequence assigned to the same aggressor group identifier.

5. The method of claim 1, wherein each of the set of base stations is a next generation node B (gNB).

6. The method of claim 1, wherein the message indicates one or more characteristics of an interference signal causing the interference, wherein the characteristics include: propagation delay of the interference signal, an angle of arrival of the interference signal, and a signal level of the interference signal.

7. The method of claim 1, wherein the message indicates a physical location of the base station.

8. The method of claim 1, wherein the respectively mapped reference signal group identifier is included an acknowledgement for the message from the base station.

9. The method of claim 1, wherein base stations sharing a same reference signal group identifier are selected into a same reference signal group based on that delay spread of reference signal sequence transmissions by the base stations is within a range.

10. A network device in charge of management in a wireless network, comprising:

processing circuitry and a non-transitory computer-readable storage medium that provides instructions that, when executed by the processing circuitry, cause the network device to perform:

receiving messages from a set of base stations, wherein each message from a base station of the set of base stations indicates that the base station is interfered;

grouping the set of base stations into a set of reference signal groups based on the messages, each reference signal group being mapped to a reference signal group identifier; and sending a respectively mapped reference signal group identifier to each of the set of base stations wherein base stations sharing a same reference signal group identifier are to transmit a same reference signal sequence assigned to a corresponding reference signal group.

11. The network device of claim 10, wherein interference is caused by another base station, which is grouped into a group of aggressor base stations that cause interferences to the set of base stations, wherein the grouping is based on messages received from one or more of the set of base stations indicating that they are interfered.

12. The network device of claim 11, wherein the group of aggressor base stations shares a same aggressor group identifier.

13. The network device of claim 10, wherein each of the set of base stations is a next generation node B (gNB).

14. A non-transitory computer-readable storage medium that provides instructions that, when executed by processing circuitry, cause a network device to perform:

receiving messages from a set of base stations, wherein each message from a base station of the set of base stations indicates that the base station is interfered;

grouping the set of base stations into a set of reference signal groups based on the messages, each reference signal group being mapped to a reference signal group identifier; and sending a respectively mapped reference signal group identifier to each of the set of base stations, wherein base stations sharing a same reference signal group identifier are to transmit a same reference signal sequence assigned to a corresponding reference signal group.

15. The non-transitory computer-readable storage medium of claim 14, wherein interference is caused by another base station, which is grouped into a group of aggressor base stations that cause interferences to the set of base stations, wherein the grouping is based on messages received from one or more of the set of base stations indicating that they are interfered.

16. The non-transitory computer-readable storage medium of claim 15, wherein the group of aggressor base stations shares a same aggressor group identifier.

17. The non-transitory computer-readable storage medium of claim 14, wherein each of the set of base stations is a next generation node B (gNB).

* * * * *

UNITED STATES PATENT AND TRADEMARK OFFICE
CERTIFICATE OF CORRECTION

| | |
|---|---|
| PATENT NO. | : 11,470,529 B2 |
| APPLICATION NO. | : 17/278168 |
| DATED | : October 11, 2022 |
| INVENTOR(S) | : Barac et al. |

Page 1 of 1

It is certified that error appears in the above-identified patent and that said Letters Patent is hereby corrected as shown below:

On the Title Page

Item (57) under "ABSTRACT", in Column 2, Line 6, delete "abase" and insert -- a base --, therefor.

In the Specification

In Column 2, Line 48, delete "T seconds" and insert -- $\tau$ seconds --, therefor.

In Column 7, Line 57, delete "Signal" and insert -- Single --, therefor.

In Column 10, Lines 7-8, delete "Physical Control Channel (PDCCH)" and insert -- Physical Downlink Control Channel (PDCCH) --, therefor.

In Columns 11 and 12, under Table, Line 11, delete "{ms0p625," and insert -- {ms0p5, ms0p625, --, therefor.

In Columns 11 and 12, under Table, Line 13, delete "slow" and insert -- slots --, therefor.

In Columns 11 and 12, under Table, Line 27, delete "proceding" and insert -- preceding --, therefor.

In Column 26, Lines 40-41, delete "power source 933," and insert -- transmitter 933, --, therefor.

In Column 37, Line 48, delete "performs the of the" and insert -- perform any of the steps of any of the --, therefor.

Signed and Sealed this
Fourth Day of April, 2023

Katherine Kelly Vidal
*Director of the United States Patent and Trademark Office*